United States Patent
Lee et al.

(10) Patent No.: US 11,435,915 B2
(45) Date of Patent: Sep. 6, 2022

(54) METHOD FOR MANAGING HARD DISK DRIVE EXPANDERS IN A CLUSTER STORAGE SYSTEM

(71) Applicant: MITAC COMPUTING TECHNOLOGY CORPORATION, Taoyuan (TW)

(72) Inventors: Tsung-Yin Lee, Taoyuan (TW); Jen-Chih Lee, Taoyuan (TW); Yi-Lan Lin, Taoyuan (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 0 days.

(21) Appl. No.: 16/898,522

(22) Filed: Jun. 11, 2020

(65) Prior Publication Data

US 2021/0004168 A1  Jan. 7, 2021

(30) Foreign Application Priority Data

Jul. 3, 2019 (TW) ................................. 108123376

(51) Int. Cl.
*G06F 3/06* (2006.01)

(52) U.S. Cl.
CPC .......... *G06F 3/0632* (2013.01); *G06F 3/0604* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 2003/0033577 A1* | 2/2003 | Anderson | G06F 3/0601 716/102 |
| 2011/0208910 A1* | 8/2011 | Takada | G06F 11/1092 711/114 |
| 2012/0233399 A1* | 9/2012 | Kurokawa | H04L 12/4625 711/E12.001 |
| 2014/0032960 A1* | 1/2014 | Konishi | G06F 11/2033 714/6.3 |
| 2015/0350322 A1* | 12/2015 | Akaike | G06F 3/067 707/827 |
| 2016/0234257 A1* | 8/2016 | Natrajan | H04L 67/1025 |
| 2016/0378389 A1* | 12/2016 | Hrischuk | G06F 3/0631 711/154 |
| 2021/0216245 A1* | 7/2021 | Hao | G06F 3/067 |

* cited by examiner

*Primary Examiner* — Stephanie Wu
(74) *Attorney, Agent, or Firm* — Jacobson Holman PLLC

(57) ABSTRACT

A method for managing HDD expanders in a cluster storage system is provided. The method according to one embodiment is implemented by each of the HDD expanders, and includes: indicating a device type of HDD expander to a parent node thereof when a device-type request originates from the parent node; and indicating a device type not of HDD expander to the parent node otherwise. The method according to another embodiment is implemented by each HDD expander connected indirectly to a root node, and includes: indicating a device type not of HDD expander to the root node when a device-type request originates from the root node; and indicating a device type of HDD expander to a node that initiates the device-type request otherwise.

9 Claims, 5 Drawing Sheets

METHOD FOR MANAGING HARD DISK DRIVE EXPANDERS IN A CLUSTER STORAGE SYSTEM

CROSS-REFERENCE TO RELATED APPLICATION

This application claims priority of Taiwanese Patent Application No. 108123376, filed on Jul. 3, 2019.

FIELD

The disclosure relates to a cluster storage system, and more particularly to a method for managing HDD expanders in a cluster storage system.

BACKGROUND

A data storage system, such as Joint Batch of Disks (JBOD), generally has a plurality of hard disk drives (HDDs) and at least one HDD expander connected to the HDDs. The HDD expander is typically configured to switch communication signals from one HDD to another.

The number of HDDs that an HDD expander can be connected to and can manage is finite, primarily limited by the number of physical links (PHYs) of the HDD expander.

SUMMARY

Therefore, an object of the disclosure is to provide a method for managing HDD expanders in a cluster storage system that can alleviate at least one of the drawbacks of the prior art. The cluster storage system further includes a host computer connected to the HDD expanders to form a hierarchical tree structure.

According to one aspect of the disclosure, the method includes steps, to be implemented by each of the HDD expanders, of:

upon receiving a device-type request for inquiring a device type from a parent node of the HDD expander in the hierarchical tree structure, determining whether the device-type request originates from the parent node;

when it is determined that the device-type request originates from the parent node, transmitting a device-type reply indicating a device type of HDD expander to the parent node, and forwarding the device-type request to each child node of the HDD expander in the hierarchical tree structure; and when it is determined that the device-type request does not originate from the parent node, transmitting a device-type reply indicating a device type not of HDD expander to the parent node.

According to another aspect of the disclosure, the method includes steps, to be implemented by each of those of the HDD expanders that are connected indirectly to the host computer, of:

upon receiving a device-type request for inquiring a device type from a parent node of the HDD expander in the hierarchical tree structure, determining whether the device-type request originates from the host computer;

when it is determined that the device-type request originates from the host computer, transmitting a device-type reply indicating a device type not of HDD expander to the host computer; and when it is determined that the device-type request does not originate from the host computer, transmitting a device-type reply indicating a device type of HDD expander to a node that initiates the device-type request, and forwarding the device-type request to each child node of the HDD expander in the hierarchical tree structure.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
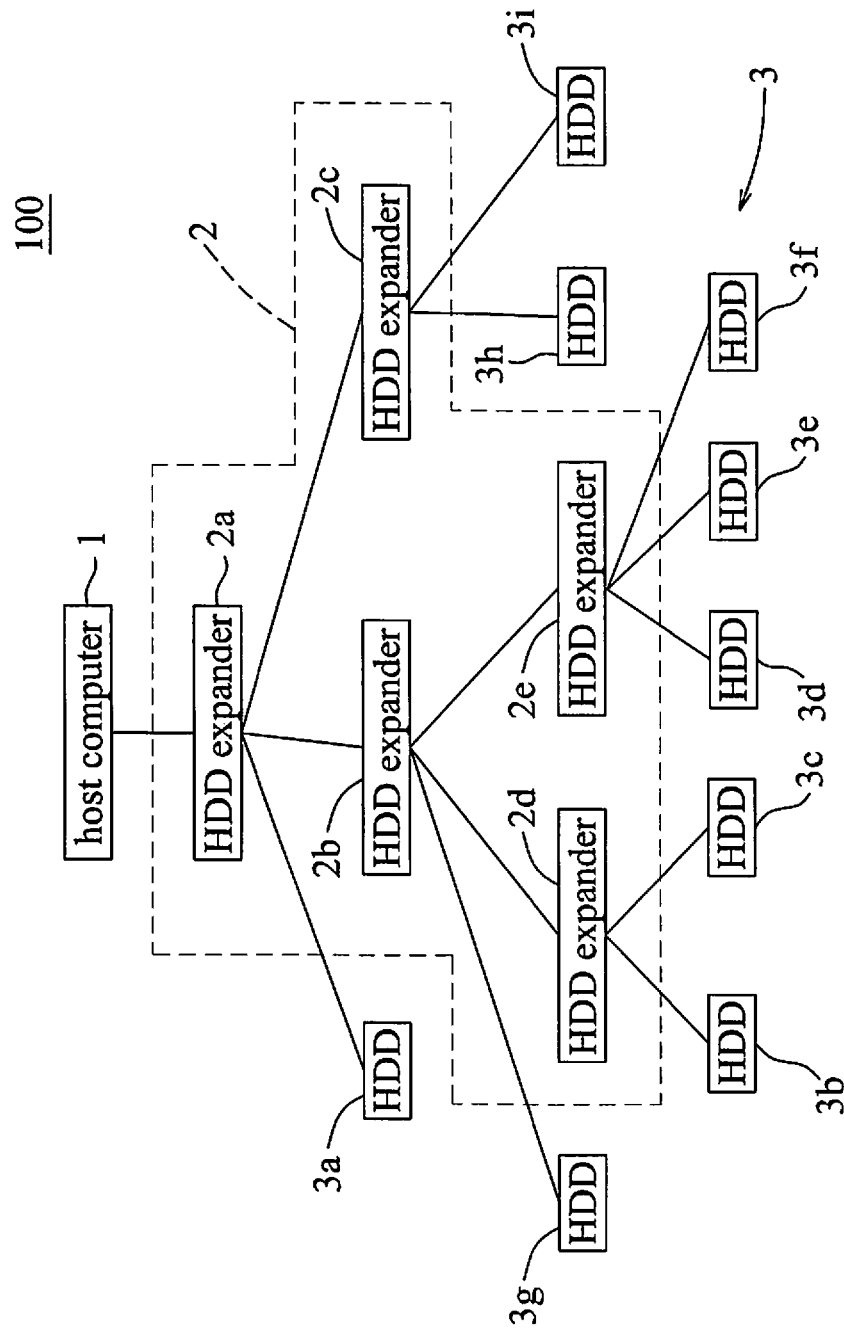
FIG. 1 is a block diagram illustrating a cluster storage system that implements a method for managing hard disk drive (HDD) expanders according to one embodiment of this disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 illustrates a cluster storage system 100 according to one embodiment of this disclosure. The cluster storage system 100 includes a host computer 1, a plurality of hard disk drive (HDD) expanders 2 connected to the host computer 1 in series, and a plurality of HDDs 3 connected to the HDD expanders 2, all together forming a hierarchical tree structure. The host computer 1 serves as a root node of the hierarchical tree structure. In the example shown in FIG. 1, the cluster storage system 100 includes five HDD expanders 2a-2e.

Figure 2:
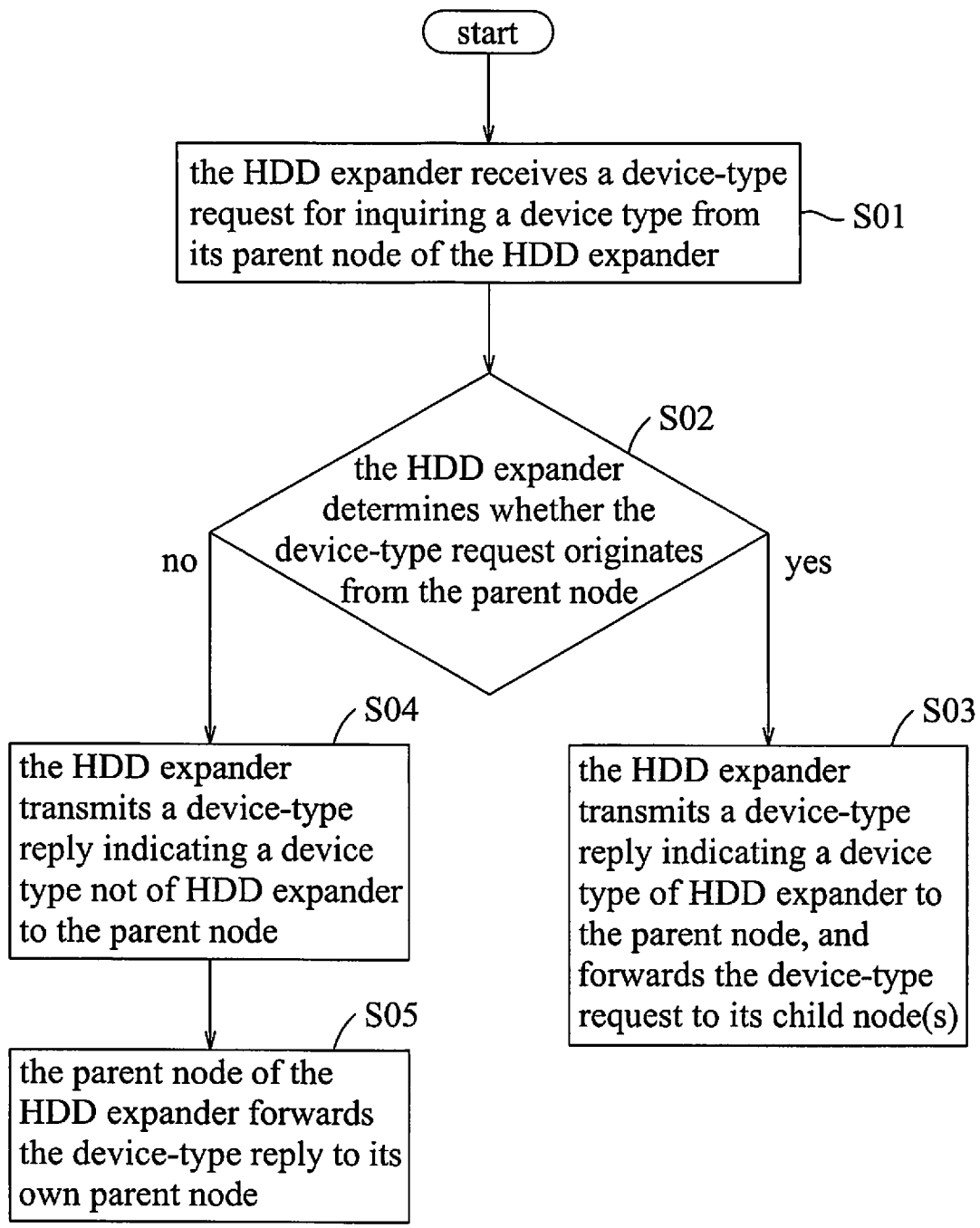
FIGS. 2 and 3 illustrate processes in accordance with one embodiment of the method for managing HDD expanders.

Further referring to FIG. 2, a method for managing the HDD expanders 2 in the cluster storage system 100 is illustrated, and includes the following steps implemented by each of the HDD expanders 2.

In step S01, the HDD expander 2 receives a device-type request for inquiring a device type from a parent node of the HDD expander 2. The device-type request includes a unique address, such as a serial attached SCSI (SAS) address, of an originator of the device-type request. It should be noted that the host computer may generate and output the device-type request when the host computer 1 is powered for the first time or when the host computer 1 detects that an HDD expander 2 is connected directly thereto for the first time. Similarly, each of the HDD expanders 2 may also generate and output the device-type request when it is powered for the first time or when it detects that another HDD expander 2 is connected directly thereto for the first time. In other embodiments, the host computer 1 may generate and output the device-type request at regular intervals.

To illustrate, the parent node of the HDD expander 2 means a node directly connected to the HDD expander 2 on an immediately upper hierarchy in the hierarchical tree structure. Each HDD expander 2 records a unique address of itself and a unique address of its parent node.

It is also noted that, throughout the disclosure, the term "directly connected" refers to a connection established between two or more nodes, such as the host computer 1 and the HDD expander 2a, via an electrically conductive material without other nodes therebetween.

In step S02, the HDD expander 2 determines whether the device-type request originates from the parent node based on the unique addresses (i.e., determining whether the unique address of the originator of the device-type request is identical to the unique address of the parent node stored in the HDD expander 2).

When it is determined that the device-type request originates from the parent node, the process goes to step S03; otherwise, it means that the parent node merely forwards the device-type request, and the process goes to step S04.

In step S03, the HDD expander 2 generates and transmits a first device-type reply indicating a device type of HDD expander to the parent node, and forwards the device-type request to its child node(s), if any. The first device-type reply includes the unique address of the HDD expander 2.

To illustrate, some of the HDD expanders 2, such as the HDD expanders 2a and 2b, have at least one child node in the hierarchical tree structure (the HDD expander 2a has child nodes 2b and 2c, and the HDD expander 2b has child nodes 2d and 2e); others, such as the HDD expanders 2c, 2d and 2e, have no child node.

Moving down the hierarchical tree structure, when the child node receives the device-type request, the child node will implement the abovementioned method as well, starting from step S01. As the device-type request received by the child node originates from its "grandparent" node instead of its parent node, the child node will evidently proceed to step S04.

In step S04, the HDD expander 2 generates and transmits a second device-type reply indicating a device type not of HDD expander to the parent node, and does not forward the device-type request to its child node (s). The process then proceeds to step S05. In some embodiments, the second device-type reply does not include the unique address of the HDD expander 2.

In step S05, upon receiving the second device-type reply generated by the HDD expander 2 in step S04, the parent node of the HDD expander 2 forwards the second device-type reply to its own parent node (a.k.a. the grandparent node of the HDD expander 2.

It can be appreciated that when the HDD expander 2 acknowledges its device type of HDD expander (for example, by sending out the first device-type reply), the HDD expander 2 will implement a downward scanning process to inquire a device type of its child node. On the other hand, when the HDD expander 2 denies its device type of HDD expander (for example, by sending out the second device-type reply), the scanning process will be stopped.

For example, in a case where the device-type request originates from the host computer 1 (see FIG. 1), in response to receipt of the device-type request therefrom (S01), the HDD expander 2a generates and transmits the first device-type reply indicating a device type of HDD expander to the host computer 1, and forwards the device-type request to the HDD expanders 2b, 2c (S03). Next, upon receiving the device-type request forwarded from the HDD expander 2a, each of the HDD expanders 2b, 2c determines that the device-type request does not originate from the parent node (S02), and accordingly generates and transmits the second device-type reply indicating a device type not of HDD expander to the HDD expander 2a (S04). The HDD expander 2a further forwards the second device-type reply to the host computer 1 (S05).

In this way, no matter how complex the hierarchical tree structure is, when the host computer 1 inquires a device type of each descendant node, only the child node of the host computer 1 (i.e. the HDD expander 2a in the example of FIG. 1) will be recognized by the host computer 1 as a HDD expander in the hierarchical tree structure. In this instance, the HDD expanders 2b, 2c transmit the second device-type reply to deny their device type of HDD expander, and are not recognized by the host computer 1 as a HDD expander. Since the HDD expander 2b does not forward the device-type request to its child nodes, the HDD expanders 2d, 2e are not even inquired for a device type, and accordingly the host computer 1 is not aware of the existence of the HDD expanders 2d, 2e. As a result, the HDD expanders 2b, 2c, 2d, 2e are hidden from the host computer 1 in the hierarchical tree structure. In this way, even when the total number of the HDD expanders 2 that are connected to the host computer 1 in the cluster storage system 100 is greater than the number of physical links (PHYs) of the host computer 1, the host computer 1 can still manage the HDD expanders 2 in the hierarchical tree structure normally without any misinterpretation.

In another case that the device-type request originates from the HDD expander 2a, in response to receipt of the device-type request therefrom (S01), each of the HDD expanders 2b, 2c determines that the device-type request originates from the parent node (S02), and accordingly generates and transmits the first device-type reply indicating a device type of HDD expander to the HDD expander 2a. The HDD expander 2b further forwards the device-type request to its child nodes (i.e., the HDD expanders 2d, 2e) (S03), while the HDD expander 2c has no child node and does not forward the device-type request. Next, upon receiving the device-type request forwarded from the HDD expander 2b, each of the HDD expanders 2d, 2e determines that the device-type request does not originate from the parent node (S02), and accordingly generates and transmits the second device-type reply indicating a device type not of HDD expander to the HDD expander 2b (S04). The HDD expander 2b further forwards the second device-type replies received from the HDD expanders 2d, 2e to the HDD expander 2a (S05). As a result, the HDD expanders 2d, 2e are hidden from the HDD expander 2a as well as the host computer 1 in the hierarchical tree structure. In this way, even when the number of the HDD expanders 2 that are connected to the HDD expander 2a is greater than the number of PHYs of the HDD expander 2a, the HDD expander 2a can still manage the descendant nodes thereof in the hierarchical tree structure normally without any misinterpretation.

In further another case that the device-type request originates from the HDD expander 2b, in response to receipt of the device-type request therefrom (S01), each of the HDD expanders 2d, 2e generates and transmits the first device-type reply indicating a device type of HDD expander to the HDD expander 2b (S03). Since both of the HDD expanders 2d, 2e have no child node, they would not further forward the device-type request.

It is noted that, under such structure with managing mechanism disclosed above, the total number of the HDDs 3 of the cluster storage system 100 can be increased while the cost or difficulty in data access will not be increased.

Figure 3:
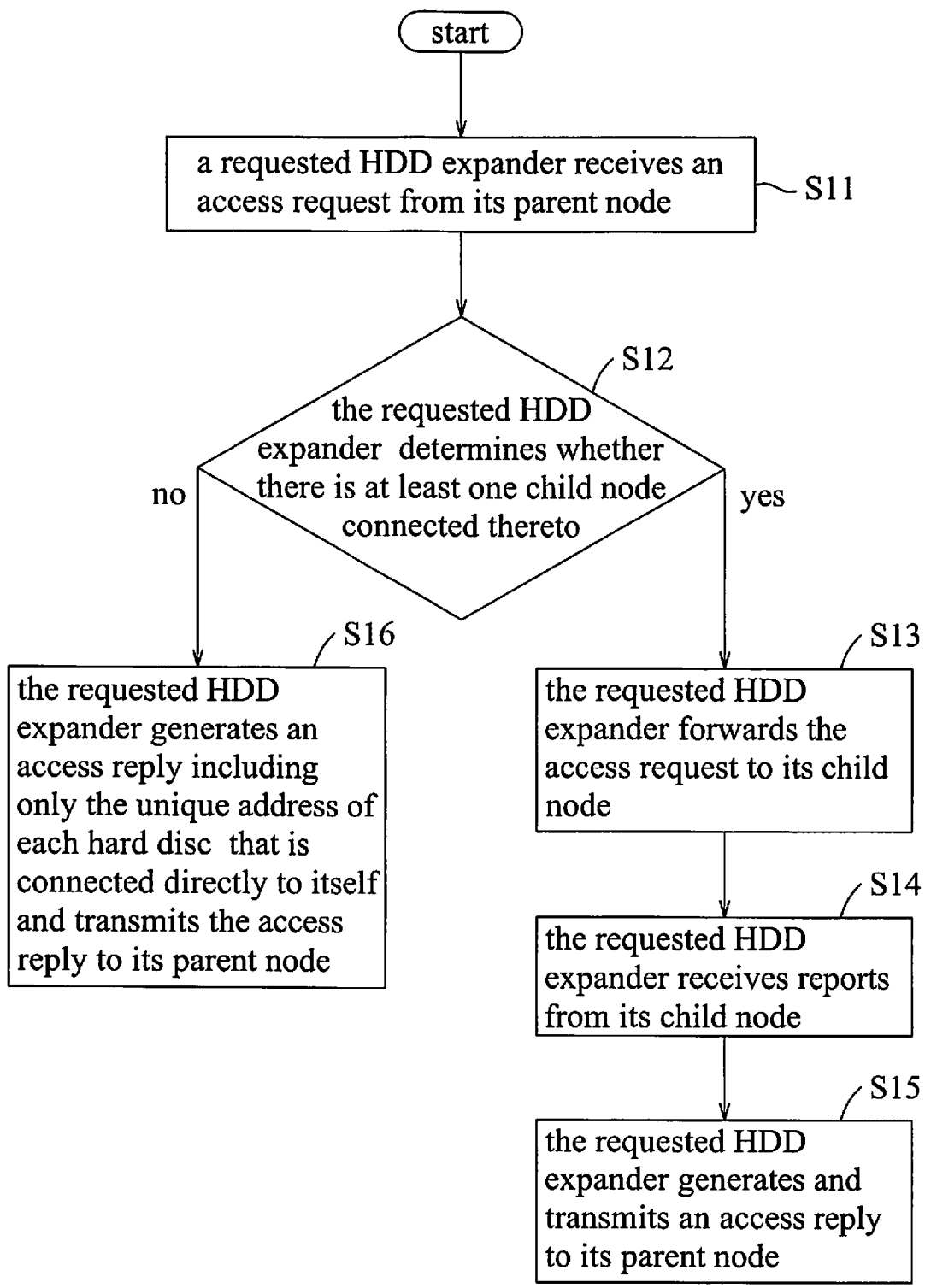

Referring to FIG. 3, when the host computer 1 or one of the HDD expanders 2 is instructed to communicate with the HDDs 3, e.g. to access data, each child node of the host computer 1 or the one of the HDD expanders 2 implements following steps.

In step S11, the child node receives an access request for accessing HDDs from its parent node (i.e. the host computer 1 or the one of the HDD expanders 2). The child node is certainly one of the HDD expanders 2, and is referred to as the requested HDD expander. 2 hereinafter.

In step S12, the requested HDD expander 2, after determining whether there is at least one child node connected thereto, proceeds to step S13-S15 when it determines that there is a child node connected thereto, and proceeds to step S16 otherwise (no child node connected).

In step S13, the requested HDD expander 2 forwards the access request to each child node thereof, and waits to receive a report from each child node.

In step S14, for each child node, the requested HDD expander 2 receives the report from the child node. Specifically, the child node of the requested HDD expander 2, upon receiving the access request, performs access requesting (similar to steps S12 and S13) downwardly to its descendant(s), if any, and collects report(s) therefrom, and then forwards all of the report(s), including the report form itself, to the requested HDD expander 2. Each report indicates a unique address of each HDD 3 that is connected directly to one that generates the report. For example, the report generated by the child node of requested HDD expander 2 indicates a unique address of each HDD 3 that is connected directly to the child node.

In step S15, the requested HDD expander 2, upon receiving the reports, generates an access reply including a unique addresses of each HDD 3 that is connected to itself directly and a unique address of each HDD 3 that is connected directly to the child node or the descendant of requested HDD expander 2 based on the reports, and transmits the access reply to its parent node.

Specifically, after receiving the reports in step S14, the requested HDD expander 2 further records all of the unique addresses of the HDDs 3 that are connected directly to the child node of requested HDD expander 2 or to the descendants of the child node.

In the case that there is no child node connected directly to the requested HDD expander 2, in step S16, the requested HDD expander 2 generates an access reply including only a unique address of each HDD 3 that is connected directly to itself, and transmits the access reply to its parent node.

It is noted that, in other embodiments, the requested HDD expander 2 may, upon receiving an access request for accessing HDD from the parent node, generate and transmit an access reply only including a unique address of each HDD that is connected directly thereto to the parent node. The requested HDD expander 2 also performs access requesting downwardly to its child node and even descendant(s), if any. In the instance that the HDD expander 2 has a child node and receives a report therefrom, the HDD expander 2 generates and transmits another access reply to the parent node.

In a case that the HDD expander 2a receives an access request from the host computer 1 (S11) (see FIG. 1), the HDD expander 2a (i.e., the requested HDD expander) determines that there are two child nodes, i.e., the HDD expanders 2b, 2c, connected thereto (S12). The HDD expander 2a forwards the access request to the HDD expanders 2b, 2c (S13).

Taking the HDD expander 2b for example, it determines that there are two child nodes, i.e., the HDD expanders 2d, 2e, connected thereto. The HDD expander 2b forwards the access request to the HDD expanders 2d, 2e. Then, the HDD expander 2b receives from the HDD expander 2d a report indicating unique addresses of the HDDs 3b, 3c that are connected directly to the HDD expander 2d, and from the HDD expander 2e a report indicating unique addresses of the HDDs 3d, 3e, 3f that are connected directly to the HDD expander 2e. The HDD expander 2b then forwards to the HDD expander 2a a report indicating a unique address of the HDD 3g that is connected directly to the HDD expander 2b, and the reports received respectively from the HDD expanders 2d, 2e.

On the other hand, the HDD expander 2c determines that there is no child node connected thereto, and transmits to the HDD expander 2a a report indicating unique addresses of the HDDs 3h, 3i that are connected directly to the HDD expander 2c.

The HDD expander 2a generates an access reply including a unique address of the HDD 3a that is connected directly to the HDD expander 2a, the unique address of the HDD 3g that is connected directly to the HDD expander 2b, the unique addresses of the HDDs 3h, 3i that are connected directly to the HDD expander 2c, and the unique addresses of the HDDs 3b, 3c, 3d, 3e, 3f that are connected to the HDD expanders 2d, 2e. Then, the HDD expander 2a transmits the access reply to the host computer 1.

Accordingly, the host computer 1 can communicate with the HDDs 3 thereunder freely based on the unique addresses indicated by the access reply.

Figure 4:
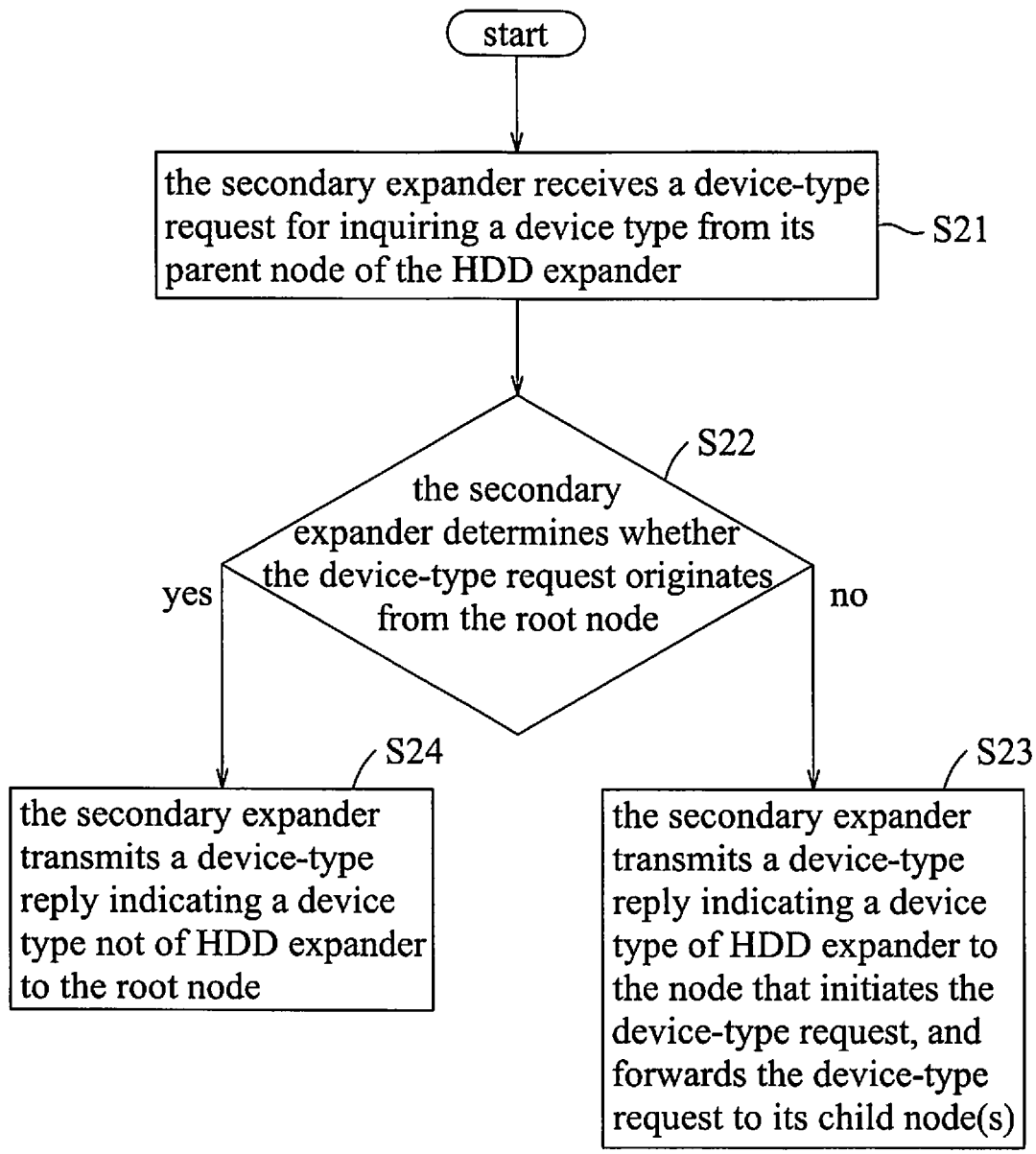
FIGS. 4 and 5 illustrate processes in accordance with another embodiment of the method for managing HDD expanders.

Referring to FIG. 4, another embodiment of the method for managing HDD expanders 2 in the cluster storage system 100 according to this disclosure is provided. However, in this embodiment, the process implemented by the HDD expander 2 that is connected directly to the root node (hereinafter referred to as the master expander) is different from the process implemented by other HDD expanders 2 that are connected indirectly to the root node (hereinafter referred to as the secondary expanders). Specifically, taking the hierarchical tree structure illustrated in FIG. 1 as an example, the host computer 1 is the root node, the HDD expander 2a is the master expander, and the HDD expanders 2b, 2c, 2d, 2e are the secondary expanders.

For the master expander, upon receiving a device-type request for inquiring a device type from the root node, the master expanders imply transmits a device-type reply indicating a device type of HDD expander to the root node and forwards the device-type request to each child node thereof.

The process implemented by each of the secondary expanders is shown in FIG. 4. For illustrations purpose, the process is illustrated in a view of one of the secondary expanders, and includes the following steps.

In step S21, the secondary expander receives a device-type request for inquiring a device type from its parent node. To illustrate, the device-type request includes a unique address of an originator of the device-type request, while each of the HDD expanders 2 (including the secondary expanders) in the hierarchical tree structure records a unique address of itself and a unique address of the root node.

In step S22, the secondary expander determines whether the device-type request originates from the root node based on the unique addresses included in the device-type request (i.e., determining whether the unique address of the originator of the device-type request is identical to the unique address of the root node).

The process goes to step S23 when it is determined that the device-type request does not originate from the root node, and goes to step S24 when it is determined that the device-type request originates from the root node.

In step S23, the secondary expander generates and transmits a first device-type reply indicating a device type of HDD expander to a node that initiates the device-type request (i.e., the originator of the device-type request), and forwards the device-type request to its child node(s), if any.

The first device-type reply includes the unique address of the secondary expander that generates the first device-type reply. In some embodiments, the secondary expander transmits the first device-type reply to the originator of the device-type request according to the unique address of the originator included in the device-type request.

To take it further, when the child node receives the device-type request, it means that the child node will implement the process starting from step S21. Then, the process of this child node goes to step S23 as well.

In step S24, the secondary expander generates and transmits a second device-type reply indicating a device type not of HDD expander to the root node (i.e., the originator of the device-type request), and does not forward the device-type request to its child node(s). The second device-type reply does not include the unique address of the HDD expander 2 that generates the second device-type reply. In some embodiments, the secondary expander transmits the second device-type reply to the root node according to the unique address of the originator included in the device-type request.

For example, in a case where the device-type request originates from the host computer 1 (the root node) (see FIG. 1), in response to receipt of the device-type request therefrom, the HDD expander 2a (the master expander) generates and transmits a device-type reply indicating a device type of HDD expander to the host computer 1 and forwards the device-type request to the HDD expanders 2b, 2c (the secondary expanders).

Upon receiving the device-type request forwarded from the HDD expander 2a (S21), each of the HDD expanders 2b, 2c, determines that the device-type request originates from the root node (S22), and accordingly generates and transmits a second device-type reply indicating a device type not of HDD expander to the host computer 1 (S24), and does not forward the device-type request to the HDD expanders 2d, 2e.

In another case that the device-type request originates from the HDD expander 2a, in response to receipt of the device-type request therefrom (S21), each of the HDD expanders 2b, 2c determines that the device-type request does not originate from the root node (S22), and accordingly generates and transmits the first device-type reply indicating a device type of HDD expander to the HDD expander 2a (S23). The HDD expander 2b further forwards the device-type request to the HDD expanders 2d, 2e. Next, upon receiving the device-type request forwarded from the HDD expander 2b, each of the HDD expanders 2d, 2e determines that the device-type request does not originate from the root node (S22), and accordingly generates and transmits the first device-type reply indicating a device type of HDD expander to the HDD expander 2b (S23).

Figure 5:
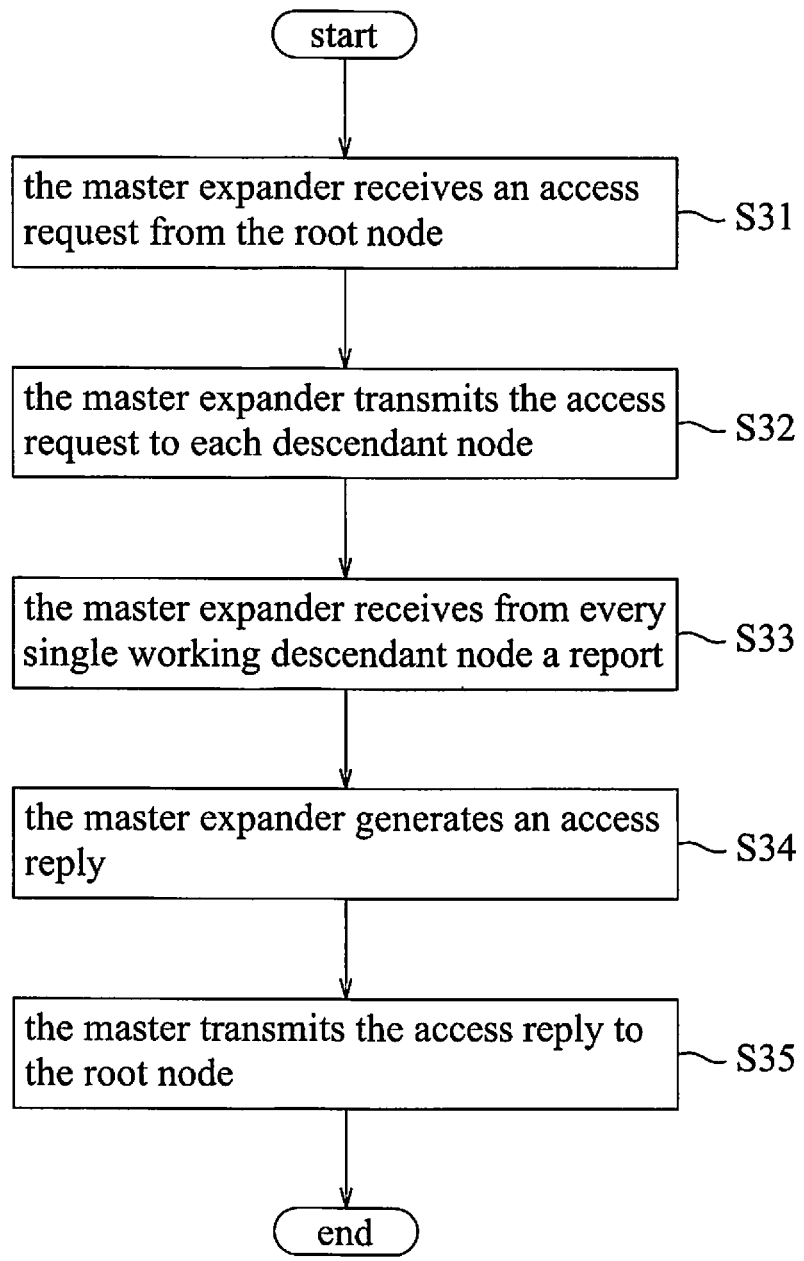

Referring to FIG. 5, the method further includes steps S31-S35, to be implemented by the master expander.

In step S31, the master expander receives from the root node an access request for accessing HDDs 3.

In step S32, the master expander transmits the access request to each descendant node thereof.

In step S33, the master expander receives from every single working descendant node a report indicating a unique address of each HDD 3 that is connected directly to the descendant node.

In step S34, the master expander generates an access reply including a unique address of each HDD 3 that is connected directly thereto, and the unique address of each HDD 3 that is connected directly to the every single working descendant node.

In step S35, the master expander transmits the access reply to the root node.

To sum up, in the method for managing the HDD expanders 2 in the cluster storage system 100 according to this disclosure, some of the HDD expanders 2 deny their device type of HDD expander and are hidden from the host computer 1 in the hierarchical tree structure. In this way, in the case that a plurality of HDD expanders are connected in series and form a hierarchical structure, the complexity of managing mechanism can be reduced.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for managing hard disk drive (HDD) expanders in a cluster storage system, the cluster storage system further including a host computer connected to the HDD expanders to form a hierarchical tree structure, the method comprising steps, to be implemented by each of the HDD expanders that is connected indirectly to a root node, of:
   upon receiving a device-type request for inquiring a device type from a parent node of the HDD expander in the hierarchical tree structure, determining whether the device-type request originates from the parent node;
   when it is determined that the device-type request originates from the parent node, transmitting a device-type reply indicating a device type of HDD expander to the parent node, and forwarding the device-type request to each child node of the HDD expander in the hierarchical tree structure; and
   when it is determined that the device-type request does not originate from the parent node, transmitting a device-type reply indicating a device type not of HDD expander to the parent node.

2. The method of claim 1, further comprising a step, to be implemented by each of the HDD expanders that is connected indirectly to the root node, of:
   after receiving the device-type request that originates from the parent node of the HDD expander, forwarding a device-type reply indicating a device type not of HDD expander received from each child node of the HDD expander to the parent node of the HDD expander.

3. The method of claim 1, the cluster storage system further including a plurality of hard disk drives (HDDs) connected to the HDD expanders to form the hierarchical tree structure together with the host computer and the HDD expander, the method further comprising a step, to be implemented by each of the HDD expanders connected indirectly to the root node, of:

after receiving an access request for accessing the HDDs from the parent node of the HDD expander, generating an access reply including a unique address of each HDD that is connected directly thereto, and transmitting the access reply to the parent node.

4. The method of claim 1, the cluster storage system further including a plurality of hard disk drives (HDDs) connected to the HDD expanders to form the hierarchical tree structure together with the host computer and the HDD expanders, the method further comprising steps, to be implemented by each of the HDD expanders connected indirectly to the root node, of:

after receiving an access request for accessing HDDs from the parent node of the HDD expander, determining whether there is a child node connected thereto;

when it is determined that there is a child node connected thereto, forwarding the access request to the child node; and after receiving from the child node a report indicating a unique address of each HDD that is connected directly to the child node, generating an access reply including a unique address of each HDD that is connected directly to the HDD expander and a unique address of each HDD that is connected directly to the child node, and transmitting the access reply to the parent node.

5. The method of claim 4, further comprising steps, to be implemented by each of the HDD expanders connected indirectly to the root node, of:

when it is determined that there is no child node connected thereto, generating an access reply including only the unique address of each HDD that is connected directly thereto, and transmitting the access reply to the parent node.

6. The method of claim 4, further comprising, after receiving the report, a step to be implemented by each of the HDD expanders connected indirectly to the root node of recording the unique address of each HDD that is connected directly to the child node.

7. The method of claim 1, wherein the device-type request including a unique address of a node that originates the device-type request.

8. A method for managing hard disk drive (HDD) expanders in a cluster storage system, the cluster storage system further including a host computer connection to the HDD expanders to form a hierarchical tree structure, the method comprising steps, to be implemented by each of the HDD expanders that is connected directly to the root node, of:

upon receiving a device-type request for inquiring a device type from a parent node of the HDD expander in the hierarchical tree structure, determining whether the device-type request originates from the parent node;

when it is determined that the device-type request originates from the parent node, transmitting a device-type reply indicating a device type of HDD expander to the parent node, and forwarding the device-type request to each child node of the HDD expander in the hierarchical tree structure.

9. A cluster storage system comprising:

a host computer; and a plurality of hard disk drive (HDD) expanders connected to said host computer to form a hierarchical tree structure, wherein each of the said HDD expanders that is connected indirectly to the root node is configured to:

upon receiving a device-type request for inquiring a device type from a parent node of said HDD expander in the hierarchical tree structure, determine whether the device-type request originates from the parent node, when it is determined that the device-type request originates from the parent node, transmit a device-type reply indicating a device type of HDD expander to the parent node, and forward the device-type request to each child node of said HDD expander in the hierarchical tree structure, and when it is determined that the device-type request does not originate from the parent node, transmit a device-type reply indicating a device type not of HDD expander to the parent node.

* * * * *